US008522541B2

(12) United States Patent
Yamagata

(10) Patent No.: US 8,522,541 B2
(45) Date of Patent: Sep. 3, 2013

(54) HYDRAULIC CIRCUIT OF WINCH FOR CRANE

(75) Inventor: Katsuki Yamagata, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 879 days.

(21) Appl. No.: 12/700,249

(22) Filed: Feb. 4, 2010

(65) Prior Publication Data

US 2010/0205955 A1 Aug. 19, 2010

(30) Foreign Application Priority Data

Feb. 16, 2009 (JP) ................................ 2009-032323

(51) Int. Cl.
*F16D 31/02* (2006.01)

(52) U.S. Cl.
USPC .................... 60/421; 60/429; 60/484; 60/486

(58) Field of Classification Search
USPC ............. 60/421, 422, 429, 484, 486; 91/531
See application file for complete search history.

(56) References Cited

FOREIGN PATENT DOCUMENTS

JP 2007-254055 10/2007

OTHER PUBLICATIONS

Office Action issued Jan. 18, 2011, in Japan Patent Application No. 2009-032323 (with English-language Translation).

*Primary Examiner* — Michael Leslie

(74) *Attorney, Agent, or Firm* — Oblon, Spivak, McClelland, Maier & Neustadt, L.L.P.

(57) ABSTRACT

Second-gear blocking switching valves 101 to 104 are provided in pipe lines providing communication between remote control valves 22, 24 and pilot operation portions of valve sections of second-gear spools of control valves. A switching selection means 105 switches the second-gear blocking switching valves 101 to 104. Proportional pressure reduction valves 111 to 114 change secondary pressure to be outputted in accordance with secondary pressure of the remote control valves. Secondary pressure changing switching valves 116 to 119 are provided in pipe lines providing communication between the remote control valves and pilot operation portions of valve sections of first-gear spools of the control valves. The secondary pressure changing switching valves are switched to first positions for transmitting the secondary pressure of the remote control valves to the pilot operation portions when the second-gear blocking switching valves are switched to transmission positions, and switched to second positions for transmitting the secondary pressure of the proportional pressure reduction valves to the pilot operation portions when the second-gear blocking switching valves are switched to block positions. In the present invention, it is possible to selectively use the one-pump and one-motor independent circuit type and the two-pump merging series circuit type, to improve the operation performance of operation levers, and to simplify the configuration of a hydraulic circuit.

2 Claims, 9 Drawing Sheets

HYDRAULIC CIRCUIT OF WINCH FOR CRANE

BACKGROUND OF THE INVENTION

1. Field of the Invention

The present invention relates to a hydraulic circuit of winches for a crane for driving two winches equipped in a mobile crane.

2. Description of Related Art

In general, two winches of a main winch and a supplementary winch are installed in a mobile crane. Hydraulic circuits for driving these two winches with using two hydraulic motors and two hydraulic pumps include the two-pump merging series circuit type and the one-pump and one-motor independent circuit type. In the one-pump and one-motor independent circuit type, pressure oil discharged from one hydraulic pump is independently supplied to one hydraulic motor. In the two-pump merging series circuit type, pressure oils discharged from two hydraulic pumps are merged by a series circuit and supplied to hydraulic motors. The two-pump merging series circuit type among these two circuit types is often adopted for a conventional mobile crane since the two-pump merging series circuit type can ensure high outputs. However, due to the characteristic of the series circuit in which a return oil of one hydraulic motor is fed to the other hydraulic motor, there is a disadvantage that the two hydraulic motors influence over each other.

Thus, the present inventors proposed to selectively use the one-pump and one-motor independent circuit type and the two-pump merging series circuit type in accordance with work contents or the like. This proposal is described in Japanese Patent Laid-Open No. 2007-254055. Hereinafter, a part of this proposal shown in FIGS. 8 and 9 will be described.

In this prior art, the configuration of a drive system of a hydraulic circuit is the same as that of the two-pump merging series circuit type. As shown in FIGS. 8 and 9, the hydraulic circuit of this prior art is provided with a first hydraulic motor 1 for driving a first winch such as a main winch, a second hydraulic motor 2 for driving a second winch such as a supplementary winch, first and second hydraulic pumps 3, 4, and first and second control valves 11, 12 for merging pressure oil discharged from both the hydraulic pumps 3, 4 and supplying the pressure oil to the first and second hydraulic motors 1, 2 in accordance with operation of operation levers 21, 23. In the first control valve 11, a first-gear spool 13 for a first winch and a second-gear spool 14 for a second winch are connected in series. The first-gear spool 13 for the first winch is stroked by secondary pressure (pilot pressure) of a first remote control valve 22 operated by the first operation lever 21. The second-gear spool 14 for the second winch is stroked by secondary pressure of a second remote control valve 24 operated by the second operation lever 23. In the second control valve 12, a second-gear spool 15 for the first winch and a first-gear spool 16 for the second winch are connected in series. The second-gear spool 15 for the first winch is stroked by the secondary pressure of the first remote control valve 22 operated by the first operation lever 21. The first-gear spool 16 for the second winch is stroked by the secondary pressure of the second remote control valve 24 operated by the second operation lever 23.

Meanwhile, a control system of the hydraulic circuit includes the first remote control valve 22 and the second remote control valve 24 as shown in FIGS. 8 and 9. The first remote control valve 22 generates the secondary pressure in accordance with the operation of the first operation lever 21 in the wind-up direction or the wind-down direction. The second remote control valve 24 generates the secondary pressure in accordance with the operation of the second operation lever 23 in the wind-up direction or the wind-down direction. Pilot pipe lines 31, 32, 33, 34 provide communication between pilot operation portions 14*a*, 14*b*, 15*a*, 15*b* of valve sections of the second-gear spools 14, 15 of the control valves 11, 12 and the remote control valves 22, 24. Four second-gear blocking switching valves 41, 42, 43, 44 are respectively provided in second-gear spool side diverged pipe lines 31*b*, 32*b*, 33*b*, 34*b* of the pilot pipe lines 31, 32, 33, 34. The second-gear blocking switching valves 41 to 44 are collectively switched by a selection switching valve 45 with using primary pressure of the remote control valves 22, 24 (that is, pressure of a pilot hydraulic source 26). The second-gear blocking switching valves 41 to 44 are switchable between transmission positions and block positions. The transmission positions are for transmitting the secondary pressure of the corresponding remote control valves 22, 24 to the pilot operation portions 14*a*, 14*b*, 15*a*, 15*b* of the valve sections of the second-gear spools 14, 15 of the control valves 11, 12. The block positions are for blocking the transmission of the secondary pressure and for providing communication between the pilot operation portions 14*a*, 14*b*, 15*a*, 15*b* and a tank 27. The selection switching valve 45 is an electromagnetic control valve for switching the second-gear blocking switching valves 41 to 44 to the transmission positions at an 'A' position to be electromagnetically turned OFF, and switching the second-gear blocking switching valves 41 to 44 to the block positions at a 'B' position to be electromagnetically turned ON. In the case where the second-gear blocking switching valves 41 to 44 are switched to the transmission positions by this selection switching valve 45, the remote control valves 22, 24 generate the secondary pressure in accordance with the operation of the operation levers 21, 23. The secondary pressure is transmitted to pilot operation portions 13*a*, 13*b*, 16*a*, 16*b* of valve sections of the first-gear spools 13, 16 of the control valves 11, 12. Further, the secondary pressure is also transmitted to the pilot operation portions 14*a*, 14*b*, 15*a*, 15*b* of the valve sections of the second-gear spools 14, 15 of the control valves 11, 12. Therefore, the first-gear spools 13, 16 and the second-gear spools 14, 15 are stroked in the operating direction of the operation levers 21, 23 in accordance with operation amounts of the operation levers 21, 23, respectively. Thereby, the two-pump merging series circuit type is realized. Meanwhile, in the case where the second-gear blocking switching valves 41 to 44 are switched to the block positions by the selection switching valve 45, the remote control valves 22, 24 generate the secondary pressure in accordance with the operation of the operation levers 21, 23. The secondary pressure is transmitted to the pilot operation portions 13*a*, 13*b*, 16*a*, 16*b* of the valve sections of the first-gear spools 13, 16 of the control valves 11, 12 but not transmitted to the pilot operation portions 14*a*, 14*b*, 15*a*, 15*b* of the valve sections of the second-gear spools 14, 15 of the control valves 11, 12. Therefore, the second-gear spools 14, 15 of the control valves 11, 12 are not stroked irrespective of the operation of the operation levers 21, 23. Thereby, the one-pump and one-motor independent circuit type is realized.

In the case of the two-pump merging series circuit type, as the relationship between the operation amounts of the operation levers 21, 23 (also called as the operation amounts of the remote control valves) and spool strokes, the first-gear spools 13, 16 firstly start stroking and reach the full stroke (the first gear), and then the second-gear spools 14, 15 start stroking and reach the full stroke (the second gear). Meanwhile, in the case of the one-pump and one-motor independent circuit type, only the first-gear spools stroke. Therefore, in the case where this one-pump and one-motor independent circuit type and two-pump merging series circuit type are selectively used, and when the one-pump and one-motor independent circuit type is selected, an invalid stroking area where the spool stroke is not changed in accordance with the operation of the operation levers 21, 23 is increased, so that the operation performance of the operation levers 21, 23 is deteriorated. The prior art is to decrease the invalid stroking area and have the same secondary pressure of the remote control valves (that is, the same operation amounts of the remote control valves) at a stroke start point of the first-gear spools in both the circuit types so as to improve the operation performance of the operation levers 21, 23. In addition to the configuration described above, the hydraulic circuit of the prior art is provided with four constant pressure reduction valves 51, 52, 53, 54, four secondary pressure switching valves 56, 57, 58, 59, a pressure reduction valve 70, four spool stroking start point shifting switching valves 71, 72, 73, 74, and four switching control switching valves 76, 77, 78, 79. The four constant pressure reduction valves 51, 52, 53, 54 reduce the secondary pressure of the remote control valves 22, 24 at constant rates respectively. The secondary pressure switching valves 56, 57, 58, 59 respectively transmit the secondary pressure of the remote control valves 22, 24 to the pilot operation portions 13*a*, 13*b*, 16*a*, 16*b* of the valve sections of the first-gear spools 13, 16 of the control valves 11, 12 in the case where the second-gear blocking switching valves 41 to 44 are switched to the transmission positions by the selection switching valve 45 (that is, in the case where the two-pump merging series circuit type is selected). The second pressure switching valves respectively transmit secondary pressure of the constant pressure reduction valves 51 to 54 to the pilot operation portions 13*a*, 13*b*, 16*a*, 16*b* of the valve sections of the first-gear spools 13, 16 of the control valves 11, 12 in the case where the second-gear blocking switching valves 41 to 44 are switched to the block positions by the selection switching valve 45 (that is, in the case where the one-pump and one-motor independent circuit type is selected). The pressure reduction valve 70 reduces the hydraulic pressure of the pilot hydraulic source 26 as primary pressure to predetermined pressure. The spool stroking start point shifting switching valves 71, 72, 73, 74 are respectively provided on the downstream sides of the secondary pressure switching valves 56 to 59 of first-gear spool side diverged pipe lines 31*a* to 34*a* of the pilot pipe lines 31 to 34. The switching control switching valves 76, 77, 78, 79 control switching actions of the shifting switching valves 71 to 74.

However, in the prior art above, there is a need for providing the four second-gear blocking switching valves 41 to 44, the four constant pressure reduction valves 51 to 54, the four secondary pressure switching valves 56 to 59, the four spool stroking start point shifting switching valves 71 to 74, and the four switching control switching valves 76 to 79 in order to control the secondary pressure of the remote control valves 22, 24. Therefore, since the hydraulic circuit is complicated, there are various problems in terms of implementation such as high cost.

SUMMARY OF THE INVENTION

It is an object of the present invention to decrease an invalid stroking area of operation levers when the one-pump and one-motor independent circuit type is selected in a hydraulic circuit in which the one-pump and one-motor independent circuit type and the two-pump merging series circuit type are selectively used in accordance with work contents or the like.

It is another object of the present invention to have the same secondary pressure of remote control valves at a stroking start point of first-gear spools in both the circuit types so as to improve the operation performance of the operation levers.

It is further another object of the present invention to simplify the configuration of the hydraulic circuit for controlling the secondary pressure of the remote control valves so as to provide a hydraulic circuit of winches for a crane which is easily implemented.

The present invention is a hydraulic circuit of winches for a crane provided with a first hydraulic motor for driving a first winch, a second hydraulic motor for driving a second winch, first and second hydraulic pumps, and first and second control valves. The first and second control valves merge pressure oils discharged from the first and second hydraulic pumps and supply the pressure oils to the first and second hydraulic motors, in accordance with operation of first and second operation levers. The first control valve is a series circuit including a first winch first-gear spool stroked by secondary pressure of a first remote control valve operated by the first operation lever and a second winch second-gear spool stroked by secondary pressure of a second remote control valve operated by the second operation lever. The second control valve is a series circuit including a first winch second-gear spool stroked by the secondary pressure of the first remote control valve operated by the first operation lever and a second winch first-gear spool stroked by the secondary pressure of the second remote control valve operated by the second operation lever. Four second-gear blocking switching valves are respectively provided in pilot pipe lines providing communication between the remote control valves and pilot operation portions of valve sections of the second-gear spools of the control valves. The second-gear blocking switching valves are switchable between transmission positions for transmitting the secondary pressure of the remote control valves to the pilot operation portions of the valve sections of the second-gear spools of the control valves and block positions for blocking the transmission of the secondary pressure and providing communication between the pilot operation portions and a tank. A switching selection means switches the second-gear blocking switching valves by a remote control operation. Four proportional pressure reduction valves change secondary pressure to be outputted in accordance with the secondary pressure of the remote control valves respectively. Four secondary pressure changing switching valves are provided in pilot pipe lines providing communication between the remote control valves and pilot operation portions of valve sections of the first-gear spools of the control valves in correspondence with the proportional pressure reduction valves, respectively. The secondary pressure changing switching valves are linked with the switching selection means so as to be switched to first positions for transmitting the secondary pressure of the remote control valves to the pilot operation portions of the valve sections of the first-gear spools when the second-gear blocking switching valves are switched to the transmission positions by the switching selection means, and to be switched to second positions for transmitting the secondary pressure of the corresponding proportional pressure reduction valves to the pilot operation portions of the valve sections of the first-gear spools when the second-gear blocking switching valves are switched to the block positions by the switching selection means.

With this configuration, in the case where the second-gear blocking switching valves are switched to the transmission positions by the switching selection means, the pilot pipe lines communicating with the pilot operation portions of the valve sections of the second-gear spools of the control valves in which the second-gear blocking switching valves are provided are able to communicate each other. The four secondary pressure changing switching valves respectively provided in the pilot pipe lines communicating with the pilot operation portions of the valve sections of the first-gear spools of the control valves are switched to the first positions for transmitting the secondary pressure of the remote control valves to the pilot operation portions by the switching selection means. Further, the pilot pipe lines communicating with the pilot operation portions of the valve sections of the first-gear spools of the control valves are also able to communicate each other. Therefore, when the remote control valves generate the secondary pressure in accordance with the operation of the operation levers, the secondary pressure is transmitted to the pilot operation portions of the valve sections of the first-gear spool and the pilot operation portions of the valve sections of the second-gear spools of the control valves. Thus, the first-gear spools and the second-gear spools are stroked in the operating direction of the operation levers in accordance with operation amounts of the operation levers respectively. Thereby, the two-pump merging series circuit type is realized. In this case, as the relationship between the operation amounts of the operation levers and spool strokes, the first-gear spools firstly start stroking and reach the full stroke, and then the second-gear spools start stroking and reach full stroke.

Meanwhile, in the case where the second-gear blocking switching valves are switched to the block positions by the switching selection means, the pilot pipe lines communicating with the pilot operation portions of the valve sections of the second-gear spools of the control valves are blocked by the second-gear blocking switching valves. The four secondary pressure changing switching valves respectively provided in the pilot pipe lines communicating with the pilot operation portions of the valve sections of the first-gear spools of the control valves are switched to the second positions for transmitting the secondary pressure of the corresponding proportional pressure reduction valves to the pilot operation portions of the valve sections of the first-gear spools by the switching selection means. Therefore, even when the remote control valves generate the secondary pressure in accordance with the operation of the operation levers, the secondary pressure is not transmitted to the pilot operation portions of the valve sections of the first-gear spools and the pilot operation portions of the valve sections of the second-gear spools of the control valves. Whereas, only the secondary pressure of the proportional pressure reduction valves is transmitted to the pilot operation portions of the valve sections of the first-gear spools of the control valves. Therefore, the second-gear spools of the control valves are not stroked irrespective of the operation of the operation levers. Thereby, the one-pump and one-motor independent circuit type is realized.

Furthermore, in this case, a pressure oil to be transmitted to the pilot operation portions of the valve sections of the first-gear spools of the control valves is not the secondary pressure of the remote control valves generated in accordance with the operation of the operation levers but the secondary pressure of the proportional pressure reduction valves changing the secondary pressure to be outputted in accordance with the secondary pressure of the remote control valves. Therefore, by properly setting the pressure reduction characteristics of the proportional pressure reduction valves, it is possible to have the secondary pressure of the remote control valves at the stroking start point of the first-gear spools which is the same as that of the case where the two-pump merging series circuit type is selected. Further, it is also possible to decrease an invalid stroking area where the spool stroke is not changed in accordance with the operation of the operation levers.

According to another preferred mode of the present invention, the secondary pressure changing switching valves in the mode above are linked with the switching selection means so as to be switched to first positions for transmitting the secondary pressure of the corresponding proportional pressure reduction valves to the pilot operation portions of the valve sections of the first-gear spools when the second-gear blocking switching valves are switched to the transmission positions by the switching selection means, and to be switched to second positions for transmitting the secondary pressure of the remote control valves to the pilot operation portions of the valve sections of the first-gear spools when the second-gear blocking switching valves are switched to the block positions by the switching selection means.

The one-pump and one-motor independent circuit type and the two-pump merging series circuit type are also realized with this configuration.

In this case, the stroking characteristics of the first-gear spools with the one-pump and one-motor independent circuit type selected are set so that the secondary pressure of the remote control valves at the stroking start point corresponds to the secondary pressure of the remote control valves at the point of starting stroking of the first-gear spools with the two-pump merging series circuit type selected, and so that the secondary pressure of the remote control valves at the time of full stroke corresponds to the secondary pressure of the remote control valves at the time of full stroke of the second-gear spools with the two-pump merging series circuit type selected. The pressure reduction characteristics of the proportional pressure reduction valves are also properly set. By the above mentioned settings, it is possible to ensure the relationship between the operation amounts of the operation levers and the spool strokes, in the case that the two-pump merging series circuit type is selected, such that the first-gear spools firstly start stroking and then reach the full strokes, and further then the second-gear spools start stroking and then reach the full strokes. Further, it is possible to decrease an invalid stroking area where the spool stroking is not changed in accordance with the operation of the operation levers, in the case that the one-pump and one-motor independent circuit type is selected.

DETAILED DESCRIPTION OF THE PREFERRED EMBODIMENTS

Hereinafter, the best modes for carrying out the present invention will be described with reference to the drawings.

Figure 1:
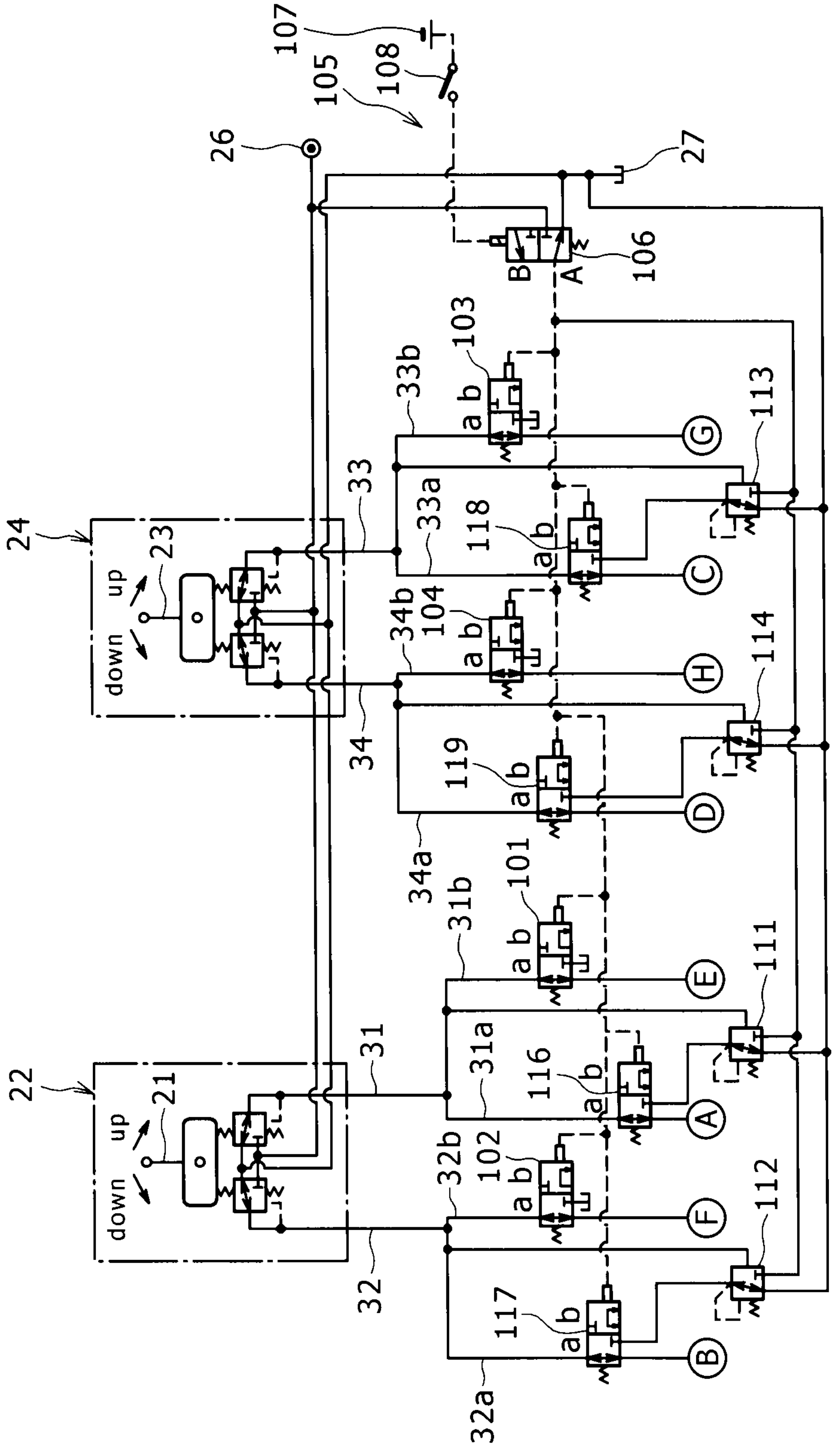
FIG. 1 is a configuration diagram of a control system of a hydraulic circuit of winches for a crane according to a first embodiment of the present invention.

FIG. 1 is a configuration diagram of a control system of a hydraulic circuit of winches for a crane according to a first embodiment of the present invention. The major configuration of a drive system of this hydraulic circuit is the same as the conventional configuration shown in FIG. 8. This hydraulic circuit is provided with a first hydraulic motor 1 for driving a first winch, a second hydraulic motor 2 for driving a second winch, and first and second hydraulic pumps 3, 4. Further, this hydraulic circuit is provided with first and second control valves 11, 12 for merging pressure oil discharged from the first and second hydraulic pumps 3, 4 and supplying the pressure oil to the first and second hydraulic motors 1, 2 in accordance with operation of first and second operation levers 21, 23 (refer to FIG. 1).

Figure 8:
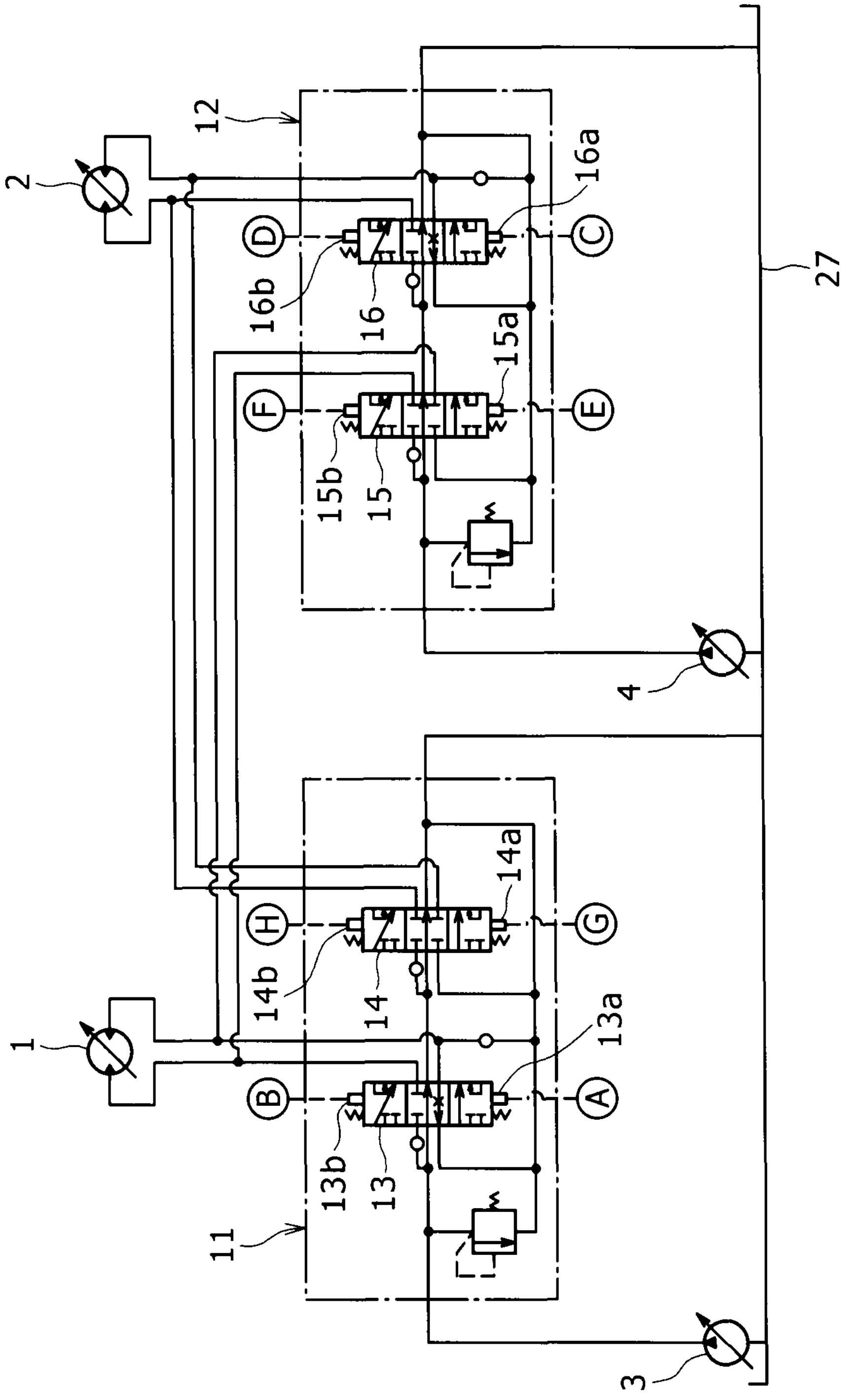
FIG. 8 PRIOR ART
FIG. 8 is a configuration diagram of a drive system of a hydraulic circuit of winches for a conventional crane.

In the first control valve 11, a first-gear spool 13 for a first winch and a second-gear spool 14 for a second winch are connected in series. The first-gear spool 13 for the first winch is stroked by secondary pressure (pilot pressure) of a first remote control valve 22 (refer to FIG. 1) operated by the first operation lever 21. The second-gear spool 14 for the second winch is stroked by secondary pressure of a second remote control valve 24 (refer to FIG. 1) operated by the second operation lever 23. In the second control valve 12, a second-gear spool 15 for the first winch and a first-gear spool 16 for the second winch are connected in series. The first winch second-gear spool 15 is stroked by the secondary pressure of the first remote control valve 22 operated by the first operation lever 21. The first-gear spool 16 for the second winch is stroked by the secondary pressure of the second remote control valve 24 operated by the second operation lever 23. It should be noted that the reference numerals of the members and the parts shown in FIG. 8 are also used in the following description.

Meanwhile, as shown in FIG. 1, the control system of the hydraulic circuit includes the first remote control valve 22 for generating the secondary pressure in accordance with the operation of the first operation lever 21 in the wind-up direction or the wind-down direction and the second remote control valve 24 for generating the secondary pressure in accordance with the operation of the second operation lever 23 in the wind-up direction or the wind-down direction. Four second-gear blocking switching valves 101, 102, 103, 104 are respectively provided in a second-gear spool side diverged pipe lines 31*b*, 32*b*, 33*b*, 34*b* of pilot pipe lines 31, 32, 33, 34 providing communication between the remote control valves 22, 24 and pilot operation portions 14*a*, 14*b*, 15*a*, 15*b* of valve sections of the second-gear spools 14, 15 of the control valves 11, 12. A switching selection means 105 switches the second-gear blocking switching valves 101 to 104 by a remote control operation. Four proportional pressure reduction valves 111, 112, 113, 114 change secondary pressure to be outputted in accordance with the secondary pressure of the remote control valves 22, 24, respectively. Four secondary pressure changing switching valves 116, 117, 118, 119 are provided in a first-gear spool side diverged pipe lines 31*a*, 32*a*, 33*a*, 34*a* of the pilot pipe lines 31 to 34 providing communication between the remote control valves 22, 24 and pilot operation portions 13*a*, 13*b*, 16*a*, 16*b* of valve sections of the first-gear spools 13, 16 of the control valves 11, 12 in correspondence with the proportional pressure reduction valves 111 to 114, respectively.

The second-gear blocking switching valves 101 to 104 are switchable between transmission positions ‘a’ and block positions ‘b’. The transmission positions ‘a’ are for transmitting the secondary pressure of the corresponding remote control valves 22, 24 to the pilot operation portions 14*a*, 14*b*, 15*a*, 15*b* of the valve sections of the second-gear spools 14, 15 of the control valves 11, 12. The block positions ‘b’ are for blocking the transmission of the secondary pressure and for providing communication between the pilot operation portions 14*a*, 14*b*, 15*a*, 15*b* and a tank 27. The second-gear blocking switching valves 101 to 104 are hydraulic pilot type valves whose switching operations are hydraulically controlled. The switching selection means 105 includes an electromagnetic switching valve 106 for collectively switching the second-gear blocking switching valves 101 to 104 with using primary pressure of the remote control valves 22, 24 (that is, pressure of a pilot hydraulic source 26), and a switch 108 to be turned ON/OFF for controlling power distribution from a battery power source 107 to the electromagnetic switching valve 106. When the switch 108 is turned OFF so that the electromagnetic switching valve 106 is switched to an ‘A’ position, the second-gear blocking switching valves 101 to 104 are switched to the transmission positions ‘a’. When the switch 108 is turned ON so that the electromagnetic switching valve 106 is switched to a ‘B’ position, the second-gear blocking switching valves 101 to 104 are switched to the block positions ‘b’.

Figure 2:
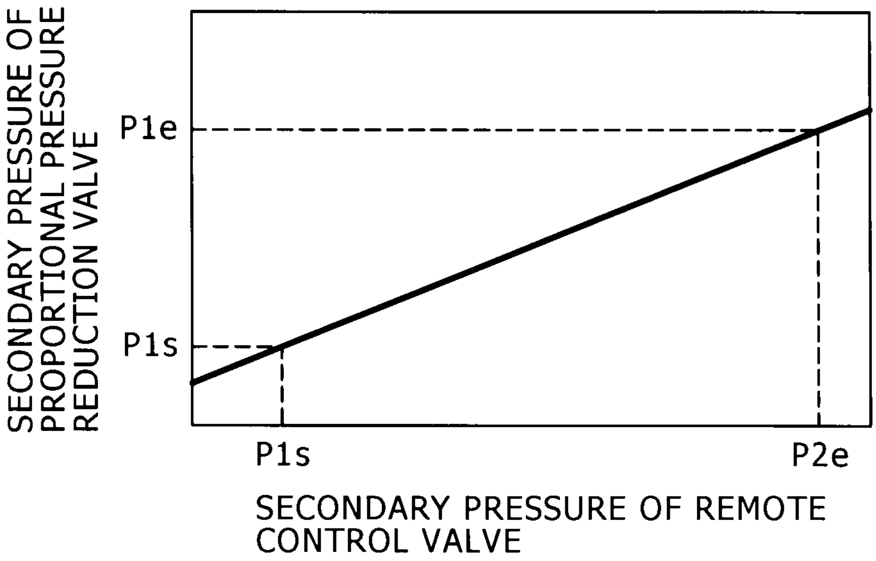
FIG. 2 is a characteristic diagram showing a relationship between secondary pressure of remote control valves and secondary pressure of proportional pressure reduction valves.

All the proportional pressure reduction valves 111 to 114 are pilot operated type valves in which the secondary pressure of the corresponding remote control valves 22, 24 is inputted as pilot pressure. FIG. 2 shows the characteristic of the change in the secondary pressure outputted by the proportional pressure reduction valves 111 to 114 relative to operation amounts of the remote control valves 22, 24, that is, the secondary pressure thereof.

Further, the secondary pressure changing switching valves 116 to 119 are switchable between first positions ‘a’ and second positions ‘b’. The first positions ‘a’ are for transmitting the secondary pressure of the corresponding remote control valves 22, 24 to the pilot operation portions 13*a*, 13*b*, 16*a*, 16*b* of the valve sections of the first-gear spools 13, 16 of the control valves 11, 12. The second positions ‘b’ are for transmitting the secondary pressure of the corresponding proportional pressure reduction valves 111 to 114 to the pilot operation portions 13*a*, 13*b*, 16*a*, 16*b* of the valve sections of the first-gear spools 13, 16 of the control valves 11, 12. The secondary pressure changing switching valves 116 to 119 are hydraulic pilot type valves whose switching operations are hydraulically controlled as well as the second-gear blocking switching valves 101 to 104. The secondary pressure changing switching valves 116 to 119 are linked with the switching selection means 105. When the switch 108 of the switching selection means 105 is turned OFF so that the electromagnetic switching valve 106 is switched to the ‘A’ position, the second-gear blocking switching valves 101 to 104 are switched to the transmission positions ‘a’, and hence the secondary pressure changing switching valves 116 to 119 are switched to the first positions ‘a’. When the switch 108 of the switching selection means 105 is turned ON so that the electromagnetic switching valve 106 is switched to the ‘B’ position, the second-gear blocking switching valves 101 to 104 are switched to the block positions ‘b’, and hence the secondary pressure changing switching valves 116 to 119 are switched to the second positions ‘b’.

Next, an operation of the hydraulic circuit will be described. In the case where the switch 108 of the switching selection means 105 is turned OFF so that the electromagnetic switching valve 106 is switched to the 'A' position, the second-gear blocking switching valves 101 to 104 are positioned on the transmission positions 'a' for transmitting the secondary pressure of the corresponding remote control valves 22, 24 to the pilot operation portions 14*a*, 14*b*, 15*a*, 15*b* of the valve sections of the second-gear spools 14, 15 of the control valves 11, 12. The secondary pressure changing switching valves 116 to 119 are positioned on the first positions 'a' for transmitting the secondary pressure of the corresponding remote control valves 22, 24 to the pilot operation portions 13*a*, 13*b*, 16*a*, 16*b* of the valve sections of the first-gear spools 13, 16 of the control valves 11, 12.

Figure 4:
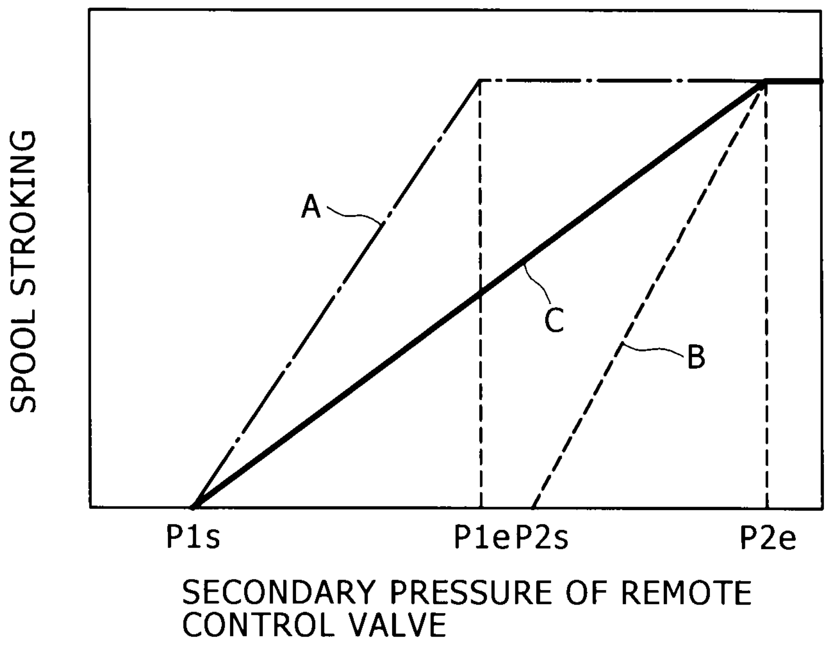
FIG. 4 is a characteristic diagram showing a relationship between the secondary pressure of the remote control valves and spool stroke.

In this case, for example when the first operation lever 21 is operated in the wind-up direction or the wind-down direction, the first remote control valve 22 generates the secondary pressure. The secondary pressure is transmitted to the pilot operation portions 13*a*, 13*b* of the valve sections of the first-gear spool 13 for the first winch of the first control valve 11 and the pilot operation portions 15*a*, 15*b* of the valve sections of the second-gear spool 15 for the first winch of the second control valve 12 through the pilot pipe lines 31, 32. Thereby, the first-gear and second-gear spools 13, 15 for the first winch are stroked in the operating direction of the first operation lever 21 in accordance with the operation amount thereof, respectively. In this case, as the change of the relationship between the operation amount of the operation lever 21 (the secondary pressure of the remote control valve) and the spool stroke, the first-gear spool 13 firstly starts stroking and reaches the full stroke as shown by a dashed-dotted line A in FIG. 4 (the first gear). Then, the second-gear spool 15 starts stroking and reaches full stroke as shown by a broken line B in FIG. 4 (the second gear). In the first gear, only the pressure oil discharged from the first hydraulic pump 3 is supplied to the first hydraulic motor 1 through the first-gear spool 13 for the first winch of the first control valve 11. In the second gear, the pressure oil discharged from the first and second hydraulic pumps 3, 4 are merged and supplied to the first hydraulic motor 1 through the first-gear and second-gear spools 13, 15 of the control valves 11, 12. Thereby, a so-called two-pump merging series circuit type is realized.

Meanwhile, in the case where the switch 108 of the switching selection means 105 is turned ON so that the electromagnetic switching valve 106 is switched to the 'B' position, the second-gear blocking switching valves 101 to 104 are positioned on the block positions 'b' for blocking the transmission of the secondary pressure of the corresponding remote control valves 22, 24 to the pilot operation portions 14*a*, 14*b*, 15*a*, 15*b* of the control valves 11, 12 and for providing communication between the pilot operation portions 14*a*, 14*b*, 15*a*, 15*b* and the tank 27. The secondary pressure changing switching valves 116 to 119 are positioned on the second positions 'b' for transmitting the secondary pressure of the corresponding proportional pressure reduction valves 111 to 114 to the pilot operation portions 13*a*, 13*b*, 16*a*, 16*b* of the valve sections of the first-gear spools 13, 16 of the control valves 11, 12.

In this case, even when the operation levers 21, 23 are operated in the wind-up direction or the wind-down direction and the remote control valves 22, 24 generate the secondary pressure in accordance with the operation thereof, the secondary pressure is not transmitted to the pilot operation portions 13*a*, 13*b*, 16*a*, 16*b* of the valve sections of the first-gear spools 13, 16 and the pilot operation portions 14*a*, 14*b*, 15*a*, 15*b* of the valve sections of the second-gear spools 14, 15 of the control valves 11, 12. Only the secondary pressure of the proportional pressure reduction valves 111 to 114 is transmitted to the pilot operation portions 13*a*, 13*b*, 16*a*, 16*b* of the valve sections of the first-gear spools 13, 16. Therefore, the second-gear spools 14, 15 of the control valves 11, 12 are not stroked irrespective of the operation of the operation levers 21, 23. Thereby, the one-pump and one-motor independent circuit type is realized.

Figure 3:
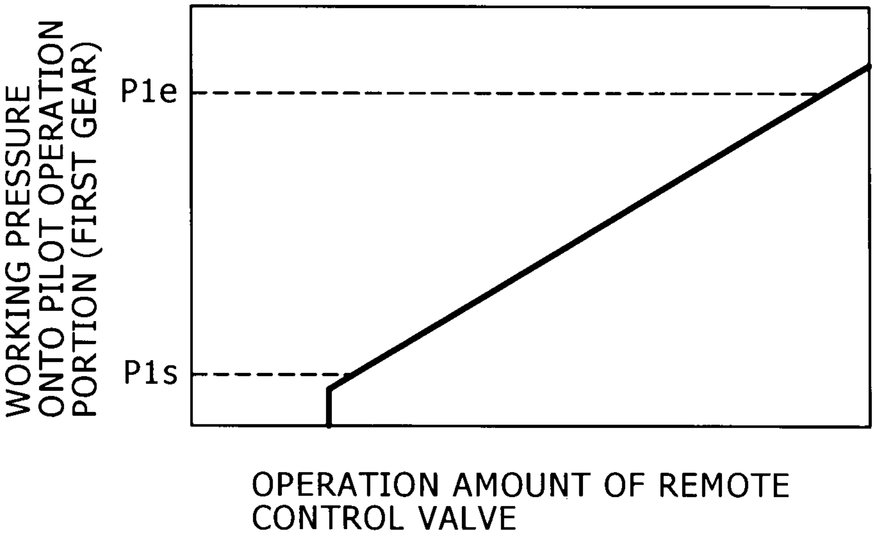
FIG. 3 is a characteristic diagram showing a relationship between operation amounts of the remote control valves and working pressure onto pilot operation portions.

In this case, the pressure oil to be transmitted to the pilot operation portions 13*a*, 13*b*, 16*a*, 16*b* of the valve sections of the first-gear spools 13, 16 of the control valves 11, 12 is not the secondary pressure of the remote control valves 22, 24 in accordance with the operation of the operation levers 21, 23 but the secondary pressure of the proportional pressure reduction valves 111 to 114 changing the secondary pressure to be outputted in accordance with the secondary pressure of the remote control valves 22, 24. Particularly, in the case of the present embodiment, the characteristic of the change in the secondary pressure of the proportional pressure reduction valves 111 to 114 is as shown in FIG. 2. In other words, when the secondary pressure of the remote control valves has a pressure value P1*s* at a stroking start point of the first-gear spools 13, 16 with the two-pump merging series circuit type selected, the secondary pressure of the proportional pressure reduction valves has the same pressure value P1*s*. Further, when the secondary pressure of the remote control valves has a pressure value P2*e* at the time of full stroke of the second-gear spools 14, 15 in the case that the two-pump merging series circuit type is selected, the secondary pressure of the proportional pressure reduction valves has a pressure value P1*e* at the time of full stroke of the first-gear spools 13, 16 in the case that the two-pump merging series circuit type is selected. Therefore, the characteristic of the change in working pressure onto the pilot operation portions 13*a*, 13*b*, 16*a*, 16*b* of the valve sections of the first-gear spools 13, 16 of the control valves 11, 12 relative to the operation amounts of the remote control valves 22, 24 is gentle as shown in FIG. 3. The relationship between the secondary pressure of the remote control valves and stroking of the first-gear spools 13, 16 is as shown by a solid line C in FIG. 4. In other words, when the secondary pressure of the remote control valves has the pressure value P1*s* at the stroke start point of the first-gear spools 13, 16 in the case that the two-pump merging series circuit type is selected, the first-gear spools 13, 16 start stroking. When the secondary pressure of the remote control valves has the pressure value P2*e* at the time of full stroke of the second-gear spools 14, 15 in the case that the two-pump merging series circuit type is selected, the first-gear spools 13, 16 reach the full stroke.

As described above, it is possible to properly change the one-pump and one-motor independent circuit type and the two-pump merging series circuit type in accordance with work contents by turning ON/OFF the switch 108 of the switching selection means 105 in the first embodiment. Moreover, it is possible to decrease an invalid stroking area of the operation levers 21, 23 in the case that the one-pump and one-motor independent circuit type is selected. Further, it is possible to have the same secondary pressure of the remote control valves at the stroking start point of the first-gear spools 13, 16 in both the circuit types so as to improve the operation performance of the operation levers.

Figure 9:
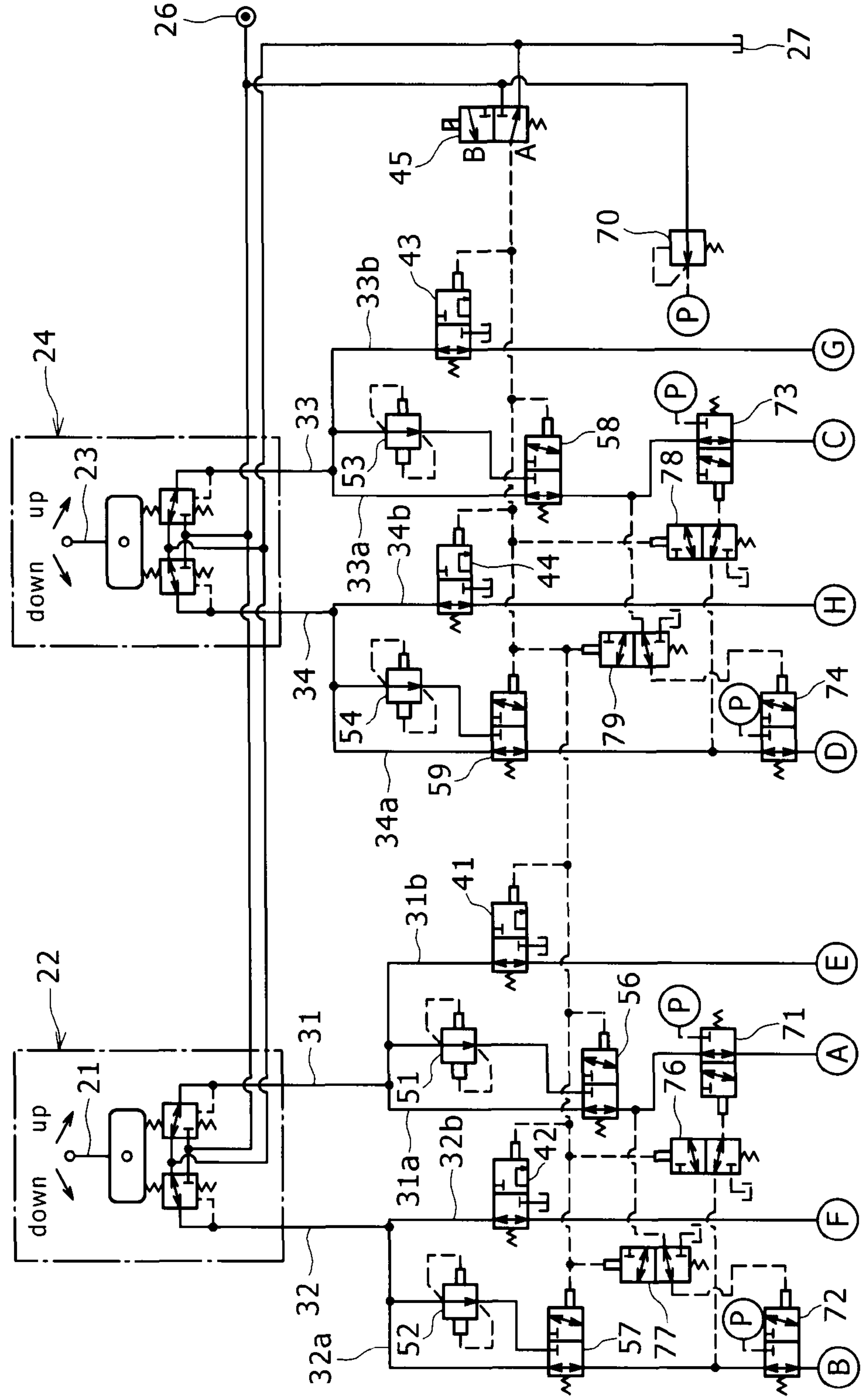
FIG. 9 PRIOR ART
FIG. 9 is a diagram showing the prior art corresponding to FIG. 1.

Furthermore, the configuration of the control system of the hydraulic circuit for controlling the secondary pressure of the remote control valves 22, 24 shown in FIG. 1 is simple with less exterior devices such as switching valves in comparison to the conventional example shown in FIG. 9. Therefore, the configuration is excellent in terms of the cost and the operation reliability and thus very advantageous for practically utilizing the hydraulic circuit.

Figure 5:
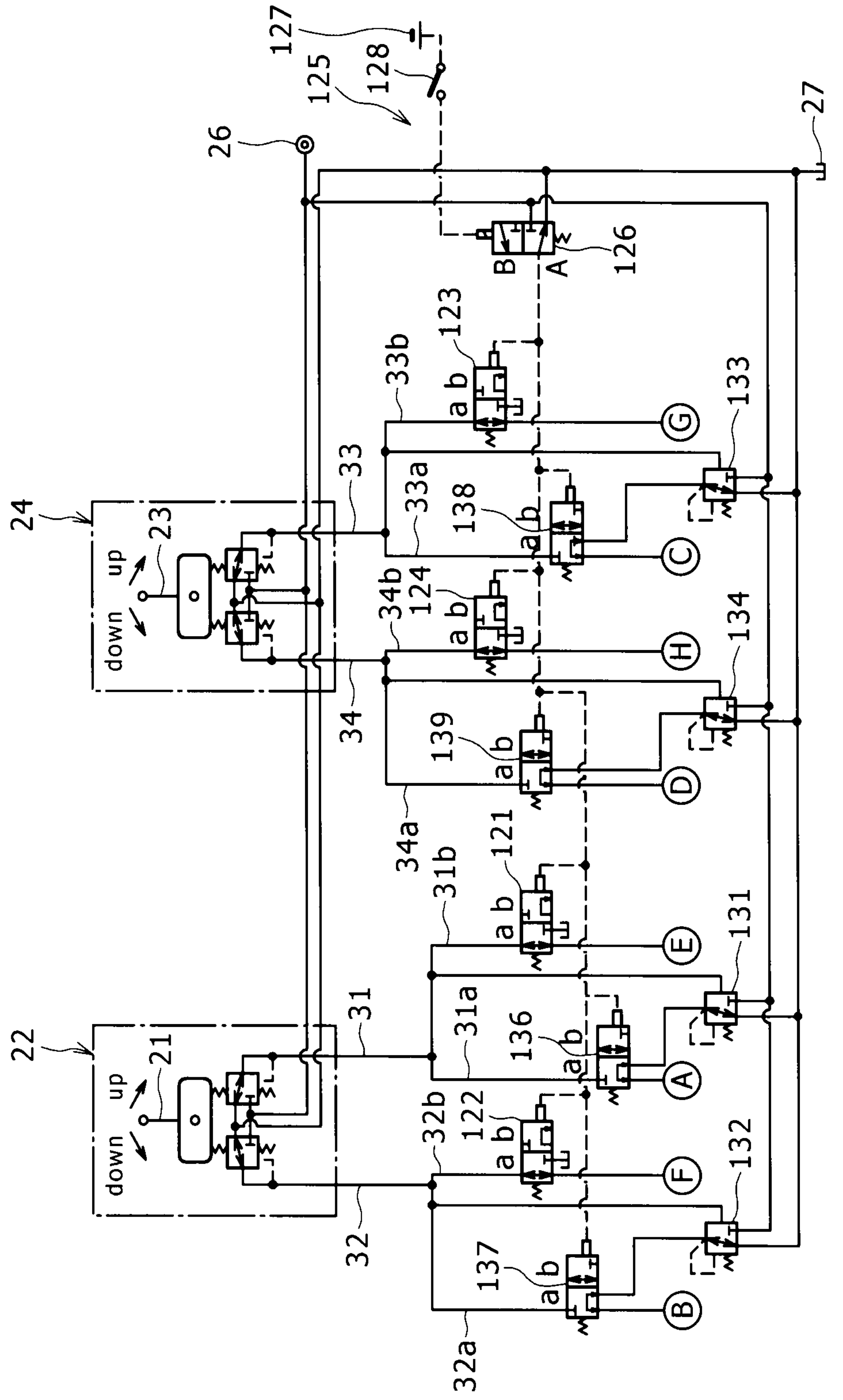
FIG. 5 is a diagram showing a second embodiment corresponding to FIG. 1.

FIG. 5 shows the configuration of a control system of a hydraulic circuit of winches for a crane according to a second embodiment of the present invention. The configuration of a drive system of this hydraulic circuit is the same as the conventional configuration shown in FIG. 8 as well as the first embodiment. In the following description, only the configuration of the control system of the hydraulic circuit will be described while utilizing the reference numerals of the members and the parts shown in FIG. 8.

That is, the control system of the hydraulic circuit is provided with four second-gear blocking switching valves 121, 122, 123, 124, a switching selection means 125, four proportional pressure reduction valves 131, 132, 133, 134, and four secondary pressure changing switching valves 136, 137, 138, 139 as shown in FIG. 5. The second-gear blocking switching valves 121, 122, 123, 124 are respectively provided in the second-gear spool side diverged pipe lines 31*b*, 32*b*, 33*b*, 34*b* of the pilot pipe lines 31, 32, 33, 34 providing communication between the remote control valves 22, 24 and the pilot operation portions 14*a*, 14*b*, 15*a*, 15*b* of the valve sections of the second-gear spools 14, 15 of the control valves 11, 12. The switching selection means 125 switches the second-gear blocking switching valves 121 to 124 by the remote control operation. The proportional pressure reduction valves 131, 132, 133, 134 change the secondary pressure to be outputted in accordance with the secondary pressure of the remote control valves 22, 24, respectively. The secondary pressure changing switching valves 136, 137, 138, 139 are provided in the first-gear spool side diverged pipe lines 31*a*, 32*a*, 33*a*, 34*a* of the pilot pipe lines 31 to 34 providing communication between the remote control valves 22, 24 and the pilot operation portions 13*a*, 13*b*, 16*a*, 16*b* of the valve sections of the first-gear spools 13, 16 of the control valves 11, 12, in correspondence with the proportional pressure reduction valves 131 to 134, respectively.

The second-gear blocking switching valves 121 to 124 are switchable between transmission positions 'a' and block positions 'b'. The transmission positions 'a' are for transmitting the secondary pressure of the corresponding remote control valves 22, 24 to the pilot operation portions 14*a*, 14*b*, 15*a*, 15*b* of the valve sections of the second-gear spools 14, 15 of the control valves 11, 12. The block positions 'b' are for blocking the transmission of the secondary pressure and for providing communication between the pilot operation portions 14*a*, 14*b*, 15*a*, 15*b* and the tank 27. The second-gear blocking switching valves 121 to 124 are hydraulic pilot type valves whose switching operations are hydraulically controlled. The switching selection means 125 includes an electromagnetic switching valve 126 for collectively switching the second-gear blocking switching valves 121 to 124 with using primary pressure of the remote control valves 22, 24 (that is, the pressure of the pilot hydraulic source 26), and a switch 128 to be turned ON/OFF for controlling the power distribution from a battery power source 127 to the electromagnetic switching valve 126. When the switch 128 of the switching selection means 125 is turned OFF so that the electromagnetic switching valve 126 is switched to an 'A' position, the second-gear blocking switching valves 121 to 124 are switched to the transmission positions 'a'. Meanwhile, when the switch 128 is turned ON so that the electromagnetic switching valve 126 is switched to a 'B' position, the second-gear blocking switching valves 121 to 124 are switched to the block positions 'b', respectively.

Figure 6:
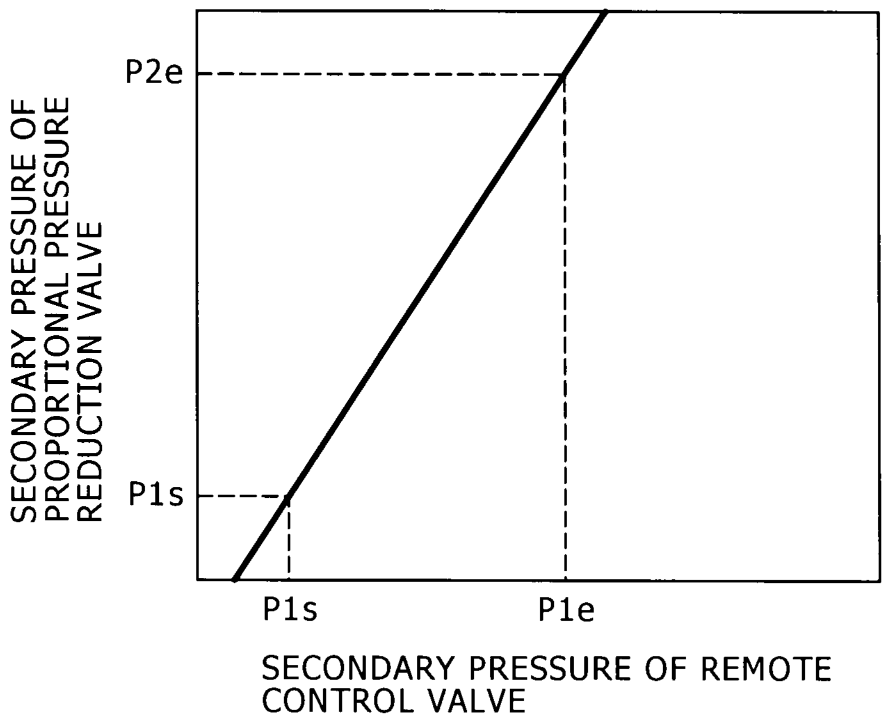
FIG. 6 is a diagram showing the second embodiment corresponding to FIG. 2.

All the proportional pressure reduction valves 131 to 134 are pilot operated type valves in which the secondary pressure of the corresponding remote control valves 22, 24 is inputted as pilot pressure. FIG. 6 shows the characteristic of the change in the secondary pressure outputted by the proportional pressure reduction valves 131 to 134 relative to the operation amounts of the remote control valves 22, 24, that is, the secondary pressure thereof.

Further, the secondary pressure changing switching valves 136 to 139 are switchable between first positions 'a' and second positions 'b'. The first positions 'a' are for transmitting the secondary pressure of the corresponding proportional pressure reduction valves 131 to 134 to the pilot operation portions 13*a*, 13*b*, 16*a*, 16*b* of the valve sections of the first-gear spools 13, 16 of the control valves 11, 12. The second positions 'b' are for transmitting the secondary pressure of the corresponding remote control valves 22, 24 to the pilot operation portions 13*a*, 13*b*, 16*a*, 16*b* of the valve sections of the first-gear spools 13, 16 of the control valves 11, 12. The secondary pressure changing switching valves 136 to 139 are hydraulic pilot type valves whose switching operations are hydraulically controlled as well as the second-gear blocking switching valves 121 to 124. The secondary pressure changing switching valves 136 to 139 are linked with the switching selection means 125. When the switch 128 of the switching selection means 125 is turned OFF so that the electromagnetic switching valve 126 is switched to the 'A' position, the second-gear blocking switching valves 121 to 124 are switched to the transmission positions 'a', and hence the secondary pressure changing switching valves 136 to 139 are switched to the first positions 'a'. Meanwhile, when the switch 128 of the switching selection means 125 is turned ON so that the electromagnetic switching valve 126 is switched to the 'B' position, the second-gear blocking switching valves 121 to 124 are switched to the block positions 'b', and hence the secondary pressure changing switching valves 136 to 139 are switched to the second positions 'b'.

Next, an operation of the hydraulic circuit will be described. In the case where the switch 128 of the switching selection means 125 is turned ON so that the electromagnetic switching valve 126 is switched to the 'B' position, the second-gear blocking switching valves 121 to 124 are positioned on the block positions 'b' for blocking the transmission of the secondary pressure of the corresponding remote control valves 22, 24 to the pilot operation portions 14*a*, 14*b*, 15*a*, 15*b* of the control valves 11, 12 and for providing communication between the pilot operation portions 14*a*, 14*b*, 15*a*, 15*b* and the tank 27. The secondary pressure changing switching valves 136 to 139 are positioned on the second positions 'b' for transmitting the secondary pressure of the corresponding remote control valves 22, 24 to the pilot operation portions 13*a*, 13*b*, 16*a*, 16*b* of the valve sections of the first-gear spools 13, 16 of the control valves 11, 12.

In this case, when the operation levers 21, 23 are operated in the wind-up direction or the wind-down direction, the remote control valves 22, 24 generate the secondary pressure in accordance with the operation thereof. The secondary pressure is transmitted to the pilot operation portions 13*a*, 13*b*, 16*a*, 16*b* of the valve sections of the first-gear spools 13, 16 of the control valves 11, 12 through the pilot pipe lines 31 to 34 and the secondary pressure changing switching valves 136 to 139. Thereby, the first-gear spools 13, 16 are stroked in the operating direction of the operation levers 21, 23 in accordance with the operation amounts thereof, respectively. Meanwhile, since the secondary pressure is not transmitted to the pilot operation portions 14*a*, 14*b*, 15*a*, 15*b* of the valve sections of the second-gear spools 14, of the control valves 11, 12, the second-gear spools 14, 15 are not stroked irrespective of the operation of the operation levers 21, 23. Thereby, the one-pump and one-motor independent circuit type is realized. As the stroking characteristics of the first-gear spools 13, 16 in the case that the one-pump and one-motor independent circuit type is selected, as shown by the solid line C in FIG. 4, the secondary pressure of the remote control valves at the stroking start point is set so as to correspond to the secondary pressure P1*s* of the remote control valves at the stroking start point of the first-gear spools 13, 16 in the case that the two-pump merging series circuit type is selected, and the secondary pressure of the remote control valves at the time of full stroke is set so as to correspond to the secondary pressure P2*e* of the remote control valves at the time of full stroke of the second-gear spools 14, 15 in the case that the two-pump merging series circuit type is selected.

Meanwhile, in the case where the switch 128 of the switching selection means 125 is turned OFF so that the electromagnetic switching valve 126 is switched to the 'A' position, the second-gear blocking switching valves 121 to 124 are positioned on the transmission positions 'a' for transmitting the secondary pressure of the corresponding remote control valves 22, 24 to the pilot operation portions 14*a*, 14*b*, 15*a*, 15*b* of the valve sections of the second-gear spools 14, 15 of the control valves 11, 12. The secondary pressure changing switching valves 136 to 139 are positioned on the first positions 'a' for transmitting the secondary pressure of the corresponding proportional pressure reduction valves 131 to 134 to the pilot operation portions 13*a*, 13*b*, 16*a*, 16*b* of the valve sections of the first-gear spools 13, 16 of the control valves 11, 12.

Figure 7:
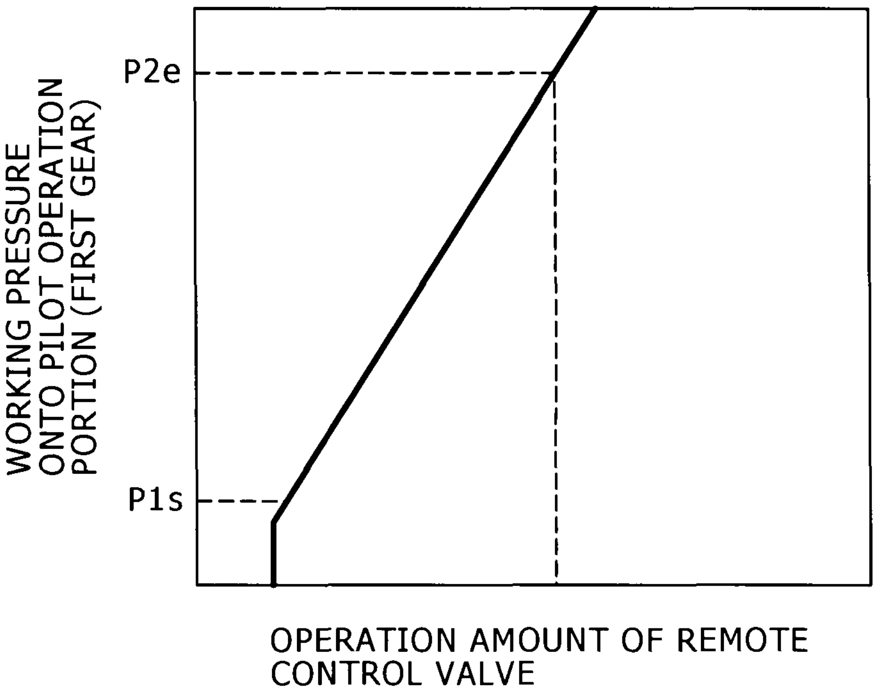
FIG. 7 is a diagram showing the second embodiment corresponding to FIG. 3.

In this case, when the operation levers 21, 23 are operated in the wind-up direction or the wind-down direction and the remote control valves 22, 24 generate the secondary pressure in accordance with the operation thereof, the secondary pressure is transmitted to the pilot operation portions 14*a*, 14*b*, 15*a*, 15*b* of the valve sections of the second-gear spools 14, 15 of the control valves 11, 12 through the pilot pipe lines 31 to 34 and the second-gear blocking switching valves 121 to 124. Thereby, the second-gear spools 14, are stroked in the operating direction of the operation levers 21, 23 in accordance with the operation amounts thereof. At the same time, the secondary pressure of the proportional pressure reduction valves 131 to 134 is transmitted to the pilot operation portions 13*a*, 13*b*, 16*a*, 16*b* of the valve sections of the first-gear spools 13, 16 of the control valves 11, 12. Therefore, the first-gear spools 13, 16 are stroked accordingly. The characteristic of the change in the secondary pressure of the proportional pressure reduction valves 131 to 134 is as shown in FIG. 6. In other words, when the secondary pressure of the remote control valves has the pressure value P1*s* at the stroking start point of the first-gear spools 13, 16 in the case that the two-pump merging series circuit type is selected, the secondary pressure of the proportional pressure reduction valves is set to have the same pressure value P1*s*. When the secondary pressure of the remote control valves has the pressure value P1*e* at the time of the full stroke of the first-gear spools 13, 16 in the case that the two-pump merging series circuit type is selected, the secondary pressure of the proportional pressure reduction valves is set to have the pressure value P2*e* at the time of full stroke of the second-gear spools 14, 15 in the case that the two-pump merging series circuit type is selected. Therefore, the characteristic of the change in the working pressure onto the pilot operation portions 13*a*, 13*b*, 16*a*, 16*b* of the valve sections of the first-gear spools 13, 16 of the control valves 11, 12 relative to the operation amounts of the remote control valves 22, 24 is radical as shown in FIG. 7. As the change of the relationship between the operation amounts of the operation levers 21, 23 (the secondary pressure of the remote control valves) and the spool strokes, the first-gear spools 13, 16 firstly start stroking and reach the full stroke as shown by the dashed-dotted line A in FIG. 4 (the first gear). Then, the second-gear spools 14, 15 start stroking and reach the full stroke as shown by the broken line B in FIG. 4 (the second gear). Thereby, the two-pump merging series circuit type is realized.

As described above, it is also possible to properly change the one-pump and one-motor independent circuit type and the two-pump merging series circuit type in accordance with work contents by turning ON/OFF the switch 128 of the switching selection means 125 in the second embodiment as well as the first embodiment. Moreover, it is possible to decrease the invalid stroking area of the operation levers 21, 23 in the case that the one-pump and one-motor independent circuit type is selected. Further, it is possible to have the same secondary pressure of the remote control valves at the stroking start point of the first-gear spools 13, 16 in both the circuit types so as to improve the operation performance of the operation levers 21, 23.

Furthermore, the configuration of the control system of the hydraulic circuit for controlling the secondary pressure of the remote control valves 22, 24 shown in FIG. 5 is simple with less exterior devices such as switching valves in comparison to the conventional example shown in FIG. 9. Therefore, the configuration is excellent in terms of the cost and the operation reliability and thus very advantageous for practically utilizing the hydraulic circuit.

It should be noted that the present invention is not limited to the above first and second embodiments but includes various other modes.

For example, in the above embodiments, the pilot operated type valves into which the secondary pressure of the remote control valves 22, 24 is inputted as pilot pressure are used as the proportional pressure reduction valves 111 to 114, 131 to 134 changing the secondary pressure to be outputted in accordance with the secondary pressure of the remote control valves 22, 24. However, electromagnetic proportional pressure reduction valves may be used instead of the pilot operated type valves, the secondary pressure of the remote control valves 22, 24 may be detected by a pressure sensor and the electromagnetic proportional pressure reduction valves may be controlled by a controller so that the characteristics shown in FIG. 2 or FIG. 6 are obtained in accordance with the detected values in the present invention.

In the above embodiments, the hydraulic pilot type valves are used as the second-gear blocking switching valves 101 to 104, 121 to 124 and the secondary pressure changing switching valves 116 to 119, 136 to 139. However, electromagnetic valves may be used instead of the hydraulic pilot type valves in the present invention. In this case, the electromagnetic switching valves 106, 126 in the above embodiments may be omitted as the switching selection means 105, 125 for switching the second-gear blocking switching valves 101 to 104, 121 to 124 by the remote control operation.

The invention claimed is:

1. A hydraulic circuit of winches for a crane, comprising:

a first hydraulic motor for driving a first winch;

a second hydraulic motor for driving a second winch;

first and second hydraulic pumps;

first and second control valves for merging pressure oil discharged from said first and second hydraulic pumps and for supplying the pressure oil to said first and second hydraulic motors in accordance with operation of first and second operation levers, said first control valve being a circuit in which a first-gear spool for the first winch stroked by secondary pressure of a first remote control valve operated by said first operation lever and a second-gear spool for the second winch stroked by secondary pressure of a second remote control valve operated by said second operation lever are connected in series, said second control valve being a circuit in which a second-gear spool for the first winch stroked by the secondary pressure of said first remote control valve operated by said first operation lever and a first-gear spool for the second winch stroked by the secondary pressure of said second remote control valve operated by said second operation lever are connected in series;

four second-gear blocking switching valves respectively provided in pilot pipe lines providing communication between said remote control valves and pilot operation portions of valve sections of said second-gear spools of said control valves, said second-gear blocking switching valves being switchable between transmission positions for transmitting the secondary pressure of said remote control valves to said pilot operation portions of said valve sections of said second-gear spools of said control valves and block positions for blocking the transmission of the secondary pressure and for providing communication between said pilot operation portions and a tank;

a switching selection means for switching said second-gear blocking switching valves by remote control operation;

four proportional pressure reduction valves changing secondary pressure to be outputted in accordance with the secondary pressure of said remote control valves; and four secondary pressure changing switching valves provided in pilot pipe lines providing communication between said remote control valves and pilot operation portions of valve sections of said first-gear spools of said control valves in correspondence with said proportional pressure reduction valves, respectively, said secondary pressure changing switching valves being linked with said switching selection means so as to be switched to first positions for transmitting the secondary pressure of said remote control valves to said pilot operation portions of said valve sections of said first-gear spools when said second-gear blocking switching valves are switched to the transmission positions by said switching selection means, and so as to be switched to second positions for transmitting the secondary pressure of said corresponding proportional pressure reduction valves to said pilot operation portions of said valve sections of said first-gear spools when said second-gear blocking switching valves are switched to the block positions by said switching selection means, wherein each of the proportional pressure reduction valves has such a characteristic of change in a secondary pressure that a secondary pressure of each of the proportional pressure reduction valves at stroking start points of said first-gear spools in a case where the second-gear blocking switching valves are switched to the block position so that a one-pump and one-motor independent circuit type is selected is the same as a secondary pressure of a corresponding remote control valve at stroking start points of said first gear spools in a case where the second-gear blocking switching valves are switched to the transmission position so that a two-pump merging series circuit type is selected.

2. A hydraulic circuit of winches for a crane, comprising:

a first hydraulic motor for driving a first winch;

a second hydraulic motor for driving a second winch;

first and second hydraulic pumps;

first and second control valves for merging pressure oil discharged from said first and second hydraulic pumps and for supplying the pressure oil to said first and second hydraulic motors in accordance with operation of first and second operation levers, said first control valve being a circuit in which a first-gear spool for the first winch stroked by secondary pressure of a first remote control valve operated by said first operation lever and a second-gear spool for the second winch stroked by secondary pressure of a second remote control valve operated by said second operation lever are connected in series, said second control valve being a circuit in which a second-gear spool for the first winch stroked by the secondary pressure of said first remote control valve operated by said first operation lever and a first-gear spool for the second winch stroked by the secondary pressure of said second remote control valve operated by said second operation lever are connected in series;

four second-gear blocking switching valves respectively provided in pilot pipe lines providing communication between said remote control valves and pilot operation portions of valve sections of said second-gear spools of said control valves, said second-gear blocking switching valves being switchable between transmission positions for transmitting the secondary pressure of said remote control valves to said pilot operation portions of said valve sections of said second-gear spools of said control valves and block positions for blocking the transmission of the secondary pressure and for providing communication between said pilot operation portions and a tank;

a switching selection means for switching said second-gear blocking switching valves by remote control operation;

four proportional pressure reduction valves changing secondary pressure to be outputted in accordance with the secondary pressure of said remote control valves; and four secondary pressure changing switching valves provided in pilot pipe lines providing communication between said remote control valves and pilot operation portions of valve sections of said first-gear spools of said control valves in correspondence with said proportional pressure reduction valves, respectively, said secondary pressure changing switching valves being linked with said switching selection means so as to be switched to first positions for transmitting the secondary pressure of said corresponding proportional pressure reduction valves to said pilot operation portions of said valve sections of said first-gear spools when said second-gear blocking switching valves are switched to the transmission positions by said switching selection means, and so as to be switched to second positions for transmitting the secondary pressure of said remote control valves to said pilot operation portions of said valve sections of said first-gear spools when said second-gear blocking switching valves are switched to the block positions by said switching selection means, wherein each of the proportional pressure reduction valves has such a characteristic of change in a secondary pressure that a secondary pressure of each of the proportional pressure reduction valves at stroking start points of said first-gear spools in a case where the second-gear blocking switching valves are switched to the transmission position so that a two-pump merging series circuit type is selected is the same as a secondary pressure of a corresponding remote control valve at stroking start points of said first-gear spools in a case where the second-gear blocking switching valves are switched to the block position so that a one-pump and one-motor independent circuit type is selected.

* * * * *